United States Patent [19]

Noggle

[11] Patent Number: 4,773,801
[45] Date of Patent: Sep. 27, 1988

[54] MANUAL PIVOT HEAD

[75] Inventor: Kenneth G. Noggle, Bloomfield, Mich.

[73] Assignee: GTE Valeron Corporation, Troy, Mich.

[21] Appl. No.: 946,229

[22] Filed: Dec. 24, 1986

[51] Int. Cl.$^4$ .................... B23C 9/00; B23B 51/00
[52] U.S. Cl. ............................. 409/234; 408/156; 408/180; 408/187
[58] Field of Search ............ 409/234, 232, 233; 408/714, 150, 180, 238, 239 R, 234 A, 151, 152, 187; 82/36 R

[56] References Cited

U.S. PATENT DOCUMENTS

| | | | |
|---|---|---|---|
| 2,279,250 | 4/1942 | Scott et al. | 408/180 |
| 2,369,875 | 2/1945 | Wanelik | 408/151 X |
| 3,097,548 | 7/1963 | Johnson | 408/150 |
| 3,686,964 | 8/1972 | Thibaut et al. | 408/180 |
| 4,281,482 | 8/1981 | Rutter | 408/714 |
| 4,351,207 | 9/1982 | Werth | 82/36 R |
| 4,432,259 | 2/1984 | Werth | 408/181 |
| 4,508,476 | 4/1985 | Kalokhe | 409/233 |
| 4,516,889 | 5/1985 | Ortlieb | 408/152 |

Primary Examiner—William R. Briggs
Attorney, Agent, or Firm—David J. Koris

[57] ABSTRACT

Manually adjustable pivot head for a rotary boring bar having a spring steel mounting plate with two opposed arcuate slots terminating in yieldable webs extending between a rigidly mounted outer ring and deflectable central portion on which an annular flange of the boring bar is secured. A manually adjusted screw effects adjustment deflection of the central portion.

9 Claims, 1 Drawing Sheet

MANUAL PIVOT HEAD

BACKGROUND OF THE INVENTION

Rotatable boring tools frequently require fine radial adjustment of the cutting tool relative to the axis of rotation of the mounting head. This is equally necessary under circumstances where a rotatable cutting tool is used where a stationary cutter is employed with a rotating work piece. Adjustment is conventionally accomplished in various ways at or near the mounting of the cutting tool on the boring bar; for example, a cutting tool cartridge may be mounted on the boring bar with adjustable means such as disclosed in the U.S. Pats. Nos. 3,102,441, 3,236,125 and 4,428,704. In other cases the tool bit is mounted at the end of the boring bar adjustable through a slide provision such as shown in U.S. Pat. No. 3,703,755 or adjustably mounted per se as disclosed in U.S. Pat. No. 3,171,188.

In many cases, particularly in tools for boring small diameters in elongated holes, the adjustment mechanism, as in the case of cartridges, involves a mounting pocket of undue dimensions relative to the diameter of the boring bar so that some provision for pivoting or laterally moving the projecting boring bar relative to the rotatable mounting head is desirable. Some tool holders utilize an internal adjustment member involving radially extending internal arms which may result in unbalanced tools and problems such as chattering and poor repeatability. One type of known tool holder is disclosed in U.S. Pat. No. 3,753,624, wherein a tool shank is supported within a housing by a forward pivotal support and an elastic rearward support which may be overcome for adjustment, causing the central shaft member to tilt radially outward. In such tool when sufficient resilient force is applied to the cutting edge, the resilient force at the rear portion of the shank may be overcome resulting in chattering.

BRIEF SUMMARY OF THE PRESENT INVENTION

A boring bar projecting from an integral rigid annular flange is mounted on a rotatable head through an intermediate, generally rigid plate constructed of spring steel wherein the central portion, to which the boring bar flange is attached, is slotted through at approximately the radius of the boring bar flange in two opposed, almost semi-circular, arcs leaving diametrically opposed integral connecting webs capable of yielding under pressure applied at one of the slotted extremities by means of a manually adjustable screw. The cutting tool at the end of the boring bar is positioned in the axial plane at which pressure is applied, resulting in a radial adjustment through deflection of the central portion of the main plate.

The connecting webs are of sufficient strength when combined with the pressure loading in triangularly spaced relation to resist chattering even under substantial cutting edge forces. The entire construction is substantially symmetrical with minimal eccentric mass which could produce high speed vibration.

BRIEF DESCRIPTION OF THE DRAWINGS

The objects, features and advantages of the present invention will be clearly understood to those skilled in the art by reference to this disclosure and the attached drawings in which.

DETAILED DESCRIPTION OF THE PREFERRED EMBODIMENT

Figure 1:
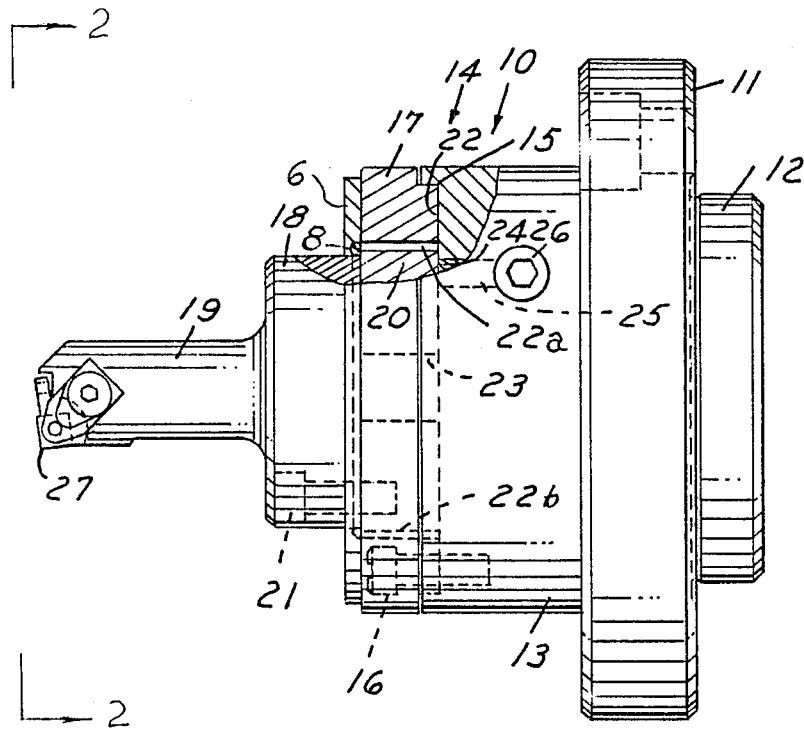
FIG. 1 is a side elevation, a preferred embodiment of the pivot head of the present invention.
Figure 2:
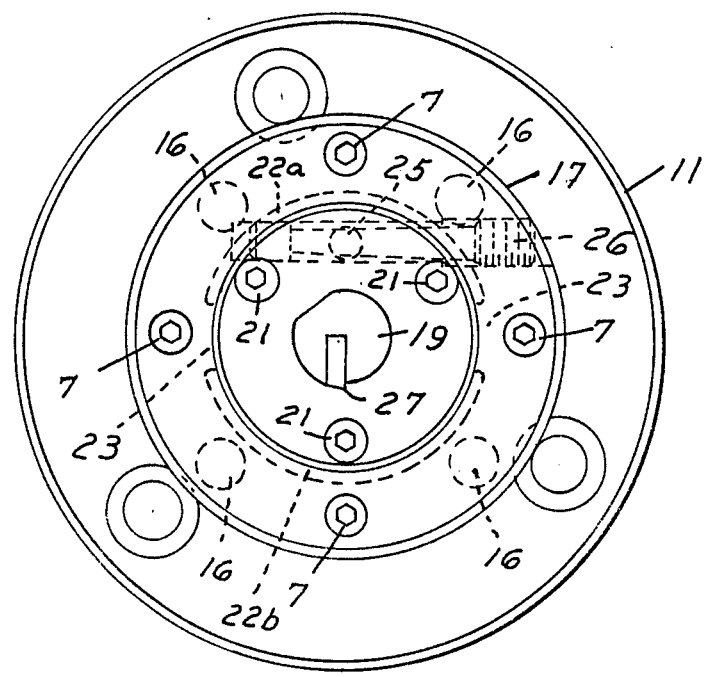
FIG. 2 is an elevation taken along the line 2-2 of FIG. 1.

With reference to FIG. 1, main body 10 of the pivot head includes attachment flange 11 wth pilot 12 and boring bar attachment annulus 13. With reference to FIGS. 1 and 2, intermediate plate 14 with pilot 15 is secured to face 22 of annulus 13 by four bolts 16 equally spaced around the outer perimeter 17. Integral flange 18 of boring bar 19 is attached to central portion 20 of plate 14 by three equally spaced bolts 21. A pair of slots 22A and 22B extend through plate 14 between outer perimeter 17 and central portion in approximately 120° arcs leaving a pair of webs 23 as the sole support for the boring bar 19. Seal cover plate 6 attached to the outer perimeter 17 by four screws 7 retains "0" ring 8 over the ends of slots 22a, 22b.

Plate 14 is constructed of spring steel, preferably of AISI 4140-4150, capable of yielding slightly at the web sections 23 in response to pressure applied at extremity 24 of center section 20, adjacent to the center of slot 22a, imposed by pin 25 actuated by tapered adjustment screw 26 having a conical portion engaging the end of the pin. Precision radial adjustment of insert point 27, extending in the same axial plane as pressure point 24, in either direction may be effected by manual advance and retraction of adjustment screw 26 with spring back of webs 23 serving to return center portion 20 to its neutral position on retraction of adjustment screw 26.

It will be understood that any cutter mounting may be employed compatible with the use and size of boring bar 19 which does not per se form a part of the present invention, and therefore, is not described in detail.

The manually adjustable pivot head disclosed herein, when constructed with a 1.75 inch diameter center section 20 has been found capable of satisfactory radial adjustment in the order of 0.012" (0.025 dia.). The semi-rigid webs 23 together with the triangularly spaced deflection pressure application point 24 have been found to provide a stable cutting action free of chatter or vibration even under application of substantial cutting force at the tip 27.

The embodiments which have been described herein are but some of several which utilize this invention and are set forth by way of illustration but not of limitation. It is apparent to those skilled in the art that variations may be made without departing materially from the spirit and scope of this invention. For example, the present invention may be readily adapted for use in a stationary cutter subject to a rotary work piece.

I claim:

1. Manually adjustable pivot head for mounting to a drive spindle comprising a body rotatable about a central axis and adapted for mounting to said spindle, a cutting tool separated from said body by a boring bar, means for mounting said boring bar to said body such that rotational motion of said body about said central axis is translated to said cutting tool from said spindle, said mounting means including an annular member having a central portion therein, said annular member being slotted to accommodate slight adjustable deflection of said central portion including said boring bar relative to an outer perimeter rigidly attached to said body, and a pin positioned normal to said central portion, a screw threaded into said body having a conical portion which engages the end of said pin so to impart axially directed force to said central portion through said pin.

2. The pivot head of claim 1 wherein said annular member is interdisposed between said body and said boring bar.

3. The pivot head of claim 2 wherein said annular member is constructed of AISI 4140-4150 spring steel.

4. The pivot head of claim 2 wherein said arcuate slots have their ends separated by a pair of integral webs.

5. The pivot head of claim 4 wherein said arcuate slots are symmetrical.

6. The pivot head of claim 5 wherein each of said arcs extends for approximately 120°.

7. The pivot head of claim 6 wherein the location for said deflection of a central portion is adjacent the center of one of said arcs.

8. The pivot head of claim 7 wherein said cutting tool is located substantially in an axial plane including said pressure location on the opposite side of said axis.

9. Manually adjustable pivot head for mounting on a drive spindle comprising a body rotatable about a central axis adapted for mounting to said spindle, an annular plate having its outer perimeter rigidly attached to said body, a boring bar having a cutting tool at one end and a flanged opposite end rigidly attached to a central portion of said plate, arcuate slot means extending through said plate between said outer perimeter and said central portion leaving yieldable web means to accommodate slight adjustable deflection of said central portion relative to said outer perimeter, a pin having an end positioned normal to said central portion, and a screw threaded into said body having a conial portion which engages said end of said pin so to impart axially directed force on said central portion at a location spaced from said web means to produce controlled radial adjustment of said cutting tool.

* * * * *